United States Patent
Singh et al.

(10) Patent No.: US 10,250,824 B2
(45) Date of Patent: Apr. 2, 2019

(54) CAMERA SENSOR WITH EVENT TOKEN BASED IMAGE CAPTURE AND RECONSTRUCTION

(71) Applicant: The University of North Carolina at Chapel Hill, Chapel Hill, NC (US)

(72) Inventors: Montek Singh, Chapel Hill, NC (US); Leandra Vicci, Siler City, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 63 days.

(21) Appl. No.: 15/318,266

(22) PCT Filed: Jun. 12, 2015

(86) PCT No.: PCT/US2015/035637
§ 371 (c)(1),
(2) Date: Dec. 12, 2016

(87) PCT Pub. No.: WO2015/192062
PCT Pub. Date: Dec. 17, 2015

(65) Prior Publication Data
US 2017/0126991 A1   May 4, 2017

Related U.S. Application Data

(60) Provisional application No. 62/011,403, filed on Jun. 12, 2014.

(51) Int. Cl.
*H04N 5/345* (2011.01)
*H04N 5/355* (2011.01)
(Continued)

(52) U.S. Cl.
CPC .............. *H04N 5/345* (2013.01); *G06T 1/20* (2013.01); *H04N 5/341* (2013.01); *H04N 5/355* (2013.01);
(Continued)

(58) Field of Classification Search
CPC .... H04N 5/345; H04N 5/3559; H04N 5/3745; H04N 5/378; G06T 1/20
See application file for complete search history.

(56) References Cited

U.S. PATENT DOCUMENTS 5,386,585 A   1/1995   Traylor
5,572,690 A   11/1996  Molnar et al.
(Continued)

FOREIGN PATENT DOCUMENTS

EP   0 913 768 A2   5/1999
WO   WO 01/82053 A2   11/2001
(Continued)

OTHER PUBLICATIONS

Notification of Transmittal of the International Serach Report and the Written Opinion of the International Searching Authority, or the Declaration for International Application No. PCT/US2015/035637 (dated Sep. 10, 2015).

(Continued)

*Primary Examiner* — Twyler L Haskins
*Assistant Examiner* — Fayez Bhuiyan
(74) *Attorney, Agent, or Firm* — Jenkins, Wilson, Taylor & Hunt, P.A.

(57) ABSTRACT

The subject matter described herein includes a camera sensor with event token based image capture and reconstruction. The sensor includes a photodetector for capturing light from a portion of a scene and for producing a signal indicative of the light. An integrator is coupled to the photodetector for accumulating charge resulting from the signal output by the photodetector and can be reset each time the charge reaches a predetermined level. An in-pixel processor is coupled to the integrator for resetting the integrator and generating an event token each time the predetermined level of charge is accumulated. A communication pipeline (Continued)

communicates the event tokens for downstream processing. A postprocessor is coupled to the pipeline for receiving the event tokens and for determining output intensity for the portion of the scene being reconstructed based on a number of reset events and a time between at least two of the event tokens.

27 Claims, 3 Drawing Sheets

(51) Int. Cl.
  *H04N 5/3745* (2011.01)
  *G06T 1/20* (2006.01)
  *H04N 5/341* (2011.01)
  *H04N 5/378* (2011.01)
(52) U.S. Cl.
  CPC ............ *H04N 5/3559* (2013.01); *H04N 5/378* (2013.01); *H04N 5/3745* (2013.01)

(56) References Cited

U.S. PATENT DOCUMENTS

| | | | |
|---|---|---|---|
| 5,600,848 | A | 2/1997 | Sprouil et al. |
| 5,732,233 | A | 3/1998 | Kim et al. |
| 5,794,073 | A | 8/1998 | Ramakrishnan et al. |
| 5,920,899 | A | 7/1999 | Chu |
| 6,028,453 | A | 2/2000 | Kong |
| 6,044,023 | A | 3/2000 | Proebsting |
| 6,067,417 | A | 5/2000 | Wise et al. |
| 6,094,726 | A | 7/2000 | Gonion et al. |
| 6,199,124 | B1 | 3/2001 | Ramakrishnan et al. |
| 6,587,981 | B1 | 7/2003 | Muradali et al. |
| 6,590,424 | B2 | 7/2003 | Singh et al. |
| 6,606,272 | B2 | 8/2003 | Oh et al. |
| 6,667,769 | B2 | 12/2003 | Harton et al. |
| 6,867,620 | B2 | 3/2005 | Singh et al. |
| 6,958,627 | B2 | 10/2005 | Singh et al. |
| 7,028,281 | B1 | 4/2006 | Agrawal et al. |
| 7,053,665 | B2 | 5/2006 | Singh et al. |
| 7,157,934 | B2 | 1/2007 | Teifel et al. |
| 7,466,744 | B2 | 12/2008 | Kämä |
| 7,478,222 | B2 | 1/2009 | Fant |
| 7,623,173 | B2 | 11/2009 | Nitta et al. |
| 7,706,430 | B2 | 4/2010 | Guo et al. |
| 7,719,589 | B2 | 5/2010 | Turchetta et al. |
| 7,729,893 | B2 | 6/2010 | Jeong et al. |
| 7,913,007 | B2 | 3/2011 | Singh et al. |
| 7,971,038 | B2 | 6/2011 | Wielage |
| 8,669,779 | B2 | 3/2014 | Gill et al. |
| 8,693,772 | B2 | 4/2014 | Friedhoff et al. |
| 8,872,544 | B2 | 10/2014 | Gill et al. |
| 9,838,635 | B2* | 12/2017 | Gousev .................. H04N 5/378 |
| 2002/0069347 | A1 | 6/2002 | Singh et al. |
| 2002/0141251 | A1 | 10/2002 | Oh et al. |
| 2004/0046590 | A1 | 3/2004 | Singh et al. |
| 2004/0111589 | A1 | 6/2004 | Lines et al. |
| 2006/0101178 | A1 | 5/2006 | Zhong et al. |
| 2009/0119483 | A1 | 5/2009 | Singh et al. |
| 2009/0296786 | A1 | 12/2009 | Massicotte et al. |
| 2011/0215222 | A1* | 9/2011 | Eminoglu ......... H01L 27/14634 250/208.1 |
| 2013/0299674 | A1 | 11/2013 | Fowler et al. |
| 2014/0247069 | A1 | 9/2014 | Gill et al. |
| 2014/0368712 | A1* | 12/2014 | Park ..................... H04N 5/3765 348/308 |

FOREIGN PATENT DOCUMENTS

| | | |
|---|---|---|
| WO | WO 01/82064 A2 | 11/2001 |
| WO | WO 01/95089 A2 | 12/2001 |
| WO | WO 02/35346 A1 | 5/2002 |
| WO | WO 2010/039312 A2 | 4/2010 |
| WO | WO 2010/039312 A3 | 4/2010 |

OTHER PUBLICATIONS

Ampalam et al., "Counterflow Pipelining: Architectural Support for Preemption in Asynchronous Systems using Anti-Tokens." Proc. of Intl. Conf. on Computer-Aided Design (ICCAD-06), pp. 611-618 (Nov. 2006).

Baker, "How delta-sigma ADCs work, Part 1," Data Acquisition, Analog Applications Journal, High Performance Analog Products, pp. 13-16 (2011).

Bermak et al., "A vision sensor with on-pixel ADC and in-built light adaption mechanism," Microelectronics Journal, 33, pp. 1091-1096 (2002).

Bermak, "VLSI implementation of a neuromorphic spiking pixel and investigation of various focal-plane excitation schemes." Int. J. Robot. Autom., vol. 19, No. 4, pp. 1-17 (2004).

Chen et al., "A New Wide Dynamic Range CMOS Pulse-frequency-modulation digital image sensor with in-pixel variable reference voltage," In Proc. MWSCAS, pp. 129-132 (2008).

Doge et al., "An HDR CMOS image sensor with spiking pixels, pixel-level ADC, and linear characteristics," IEEE Trans. Circuits Syst., vol. 49, No. 2, pp. 155-158 (2002).

DxOLabs, "DxOMark Sensor Scores," Use Case Scores, DxOMark, retrieved from wayback machine https://web.archive.org/web/20140702114410/http://www.dxomark.com/About/Sensor-scores/Use-Case-Scores, pp. 1-3 (Jul. 2, 2014).

DxOLabs, "Camera Sensor Ratings by DxOMark" Landscape, DxOMark, retrieved from wayback machine, https://web.archive.org/web/20140529062737/http://www.dxomark.com/Cameras/Ratings/Landscape, pp. 1-2, (May 29, 2014).

Fowler et al., "A CMOS area image sensor with pixel-level A/D conversion," Stanford University tech report, pp. 1-11 (2001).

"Human Eye," Wikipedia, The free encyclopedia, retrieved from wayback machine https://web.archive.org/web/20140503091539/http://en.wikipedia.org/wiki/Human_eye, pp. 1-13 (May 3, 2014).

Kitchen et al., "A digital pixel sensor array with programmable dynamic range." IEEE Trans. Electron Devices., vol. 52, No. 12, pp. 2891-22600 (2005).

Kitchen et al., "PWM digital pixel sensor based on asynchronous self-resetting scheme." IEEE Trans. Electron Devices., vol. 25, No. 7, pp. 471-473 (2004).

Kleinfelder et al., "A 10,000 frames/s CMOS digital pixel sensor," IEEE J. of Solid-State Circuits, vol. 36, No. 12, pp. 2049-2059 (2001).

Lavagno et al., "Guest Editors' Introduction: Asynchronous Design Is Here to Stay," Asynchronous Design [Special Issue] IEEE Design & Test of Computers (D&T), vol. 28, No. 5, pp. 4-6 (Sep./Oct. 2011).

McIlrath, "A low-power low-noise ultrawide-dynamic-range CMOS imager with pixel-parallel A/D conversion." IEEE J. of Solid-State Circuits, vol. 36, No. 5, pp. 846-853, (May 2001).

Nowick et al., "High-Performance Asynchronous Pipelines: An Overview," IEEE Design and Test of Computers (D&T), special issue on Asynchronous Design, vol. 28, No. 5, pp. 8-22 (Sep./Oct. 2011).

"Posterization," Wikipedia, The free encyclopedia, retrieved from wayback machine https://web.archive.org/web/20140715014244/http://en.wikipedia.org/wiki/Posterization, pp. 1-3 (Jul. 15, 2014).

Sasaki et al., "A wide-dynamic-range CMOS image sensor based on multiple short exposure-time readout with multiple-resolution column-parallel ADC." IEEE J. of Sensors, vol. 7, No. 1, pp. 151-158 (2007).

Singh et al., "Introduction to Special Issue: Asynchrony in System Design," Asynchrony in System Design [Special Issue], ACM Journal on Emerging Technologies in Computing Systems (JETC), vol. 7, No. 4, pp. 14:1-14:2 (Dec. 2011).

Trepanier et al., "A wide dynamic range CMOS digital pixel sensor," Proc. MWSCAS, pp. II:437-II440 (2002_.

Wang et al., "A high-dynamic-range CMOS image sensor with in-pixel light-to-frequency conversion." IEEE Trans. Electron Devices., vol. 53, No. 12, pp. 2988-2992, 2006.

(56) References Cited

OTHER PUBLICATIONS

"Weber-Fechner law," Wikipedia, the free encyclopedia, retrieved from wayback machine, https://web.archive.org/web/20140723050513/http://en.wikipedia.org/wiki/Weber-Fechner_law, pp. 1-4 (Jul. 23, 2014).
Yang et al., "A 640×512 CMOS image sensor with ultrowide dynamic range floating-point-level ADC," IEEE J. of Solid-State Circuits, vol. 34, No. 12, pp. 1821-1834 (1999).
Yang et al., "A Nyquist-Rate Pixel-Level ADC." IEEE J. of Solid-State Circuits, vol. 34, No. 3, pp. 348-356 (1999).
Borah et al., "High-Throughput and Low-Power DSP Using Clocked-CMOS Circuitry," Proceedings in International Symposium on Low-Power Design, pp. 139-144 (1995).
Brej, "Early Output Logic and Anti-Tokens," Thesis submitted to the University of Machester School of Computer Science, pp. 1-137 (Sep. 2005).
Davis et al., "Asynchronous Circuit Design: Motivation, Background, and Methods," Asynchronous Digital Circuit Design, Birtwistle et al., (eds.), Workshops in Computing, Springer-Verlag, pp. 1-49 (1995).
Day et al., "Investigation Into Micropipeline Latch Design Styles," IEEE Transactions on Very Large Scale Integration, vol. 3, No. 2, pp. 31-39 (Jun. 1995).
Dooply et al., "Optimal Clocking and Enhanced Testability for High-Performance Self-Resetting Domino Pipelines," ARVLSI, pp. 1-15 (1999).
Ebergen, "Squaring the FIFO in GasP," Proceedings, Seventh International Symposium on Advanced Research in Asynchronous Circuits and Systems (ASYNC 2001), IEEE Computer Society Press, pp. 1-12 (Mar. 11-14, 2001).
Furber et al., "Four-Phase Micropipeline Latch Control Circuits," IEEE TVLSI, vol. 4, No. 2, pp. 1-8 (Jun. 1996).
Furber, "Computing Without Clocks: Micropipelining the ARM Processor," Asynchronous Digital Circuit Design, Workshops in Computing Birtwistle et al., (eds.) Springer-Verlag, pp. 1-52 (1995).
Gill et al, "Performance Estimation and Slack Matching for Pipelined Asynchronous Architectures with Choice," IEEE, pp. 449-456 (2008).
Harris et al., "Skew-Tolerant Domino Circuits," IEEE Journal of Solid-State Circuits, vol. 32, No. 11, pp. 21-30 (Nov. 1997).
Hauck et al., "Two-Phase Asynchronous Wave-Piplines and Their Application to a 2D-DCT," Proceedings in International Symposium on Advanced Research on Asynchronous Circuits and Systems, (ASYNC), pp. 1-10 (Apr. 1999).
International Application Serial No. PCT/US01/29721 International Search Report (dated Sep. 21, 2001).
International Preliminary Report on Patentability for International Application No. PCT/US2009/049109 (dated Jan. 13, 2011).
International Search Report for International Application No. PCT/US2009/049109 (dated Apr. 28, 2010).
Liu et al., "A 250-MHz Wave Pipelined Adder in 2-µm CMOS," IEEE JSSC, vol. 29, No. 9, pp. 1117-1128 (Sep. 1994).
Martin et al., "The Design of an Asynchronous MIPS R3000 Microprocessor," Advanced Research in VLSI, pp. 1-18 (Sep. 1997).
McLaughlin et al., "A Static Technique for High-Speed CMOS State Machine Design," ASIC Conference and Exhibit, 1994 Proceedings, Seventh Annual IEEE International Rochester, NY USA Sep. 19-23, 1994, New York, NY, USA IEEE, pp. 108-111, XP010140513 ISBN: 0-7803-2020-4 the whole document (Sep. 19, 1994).
Molnar et al., "Simple Circuits that Work for Complicated Reasons," Proceedings in International Symposium on Advanced Research on Asynchronous Circuits and Systems (ASYNC), pp. 1-12 (Apr. 2000).
Molnar et al., "Two FIFO Ring Performance Experiments," Proceedings of the IEEE, vol. 87, No. 2, pp. 297-307 (Feb. 1999).
Molnar et al., "A FIFO Ring Performance Experiment," IEEE, pp. 279-289 (1997).
Mukherjee et al., Wave Sterring in YADDs: A Novel Non-Iterative Synthesis and Layout Technique, Proc. DAC, pp. 1-6 (1999).
Narayanan et al., "Static Timing Analysis for Self Resetting Circuits," Proc. ICCAD, pp. 119-126 (1996).
Non-Final Official Action for U.S. Appl. No. 13/001,034 (dated Feb. 14, 2013).
Non-Final Official Action for U.S. Appl. No. 13/001,034 (dated May 23, 2012).
Notice of Allowance and Fee(s) Due for U.S. Appl. No. 14/202,814 (dated Jun. 20, 2014).
Notice of Allowance and Fee(s) Due for U.S. Appl. No. 13/001,034 (dated Oct. 15, 2013).
Notice of Allowance and Fee(s) Due for U.S. Appl. No. 12/240,938 (dated Dec. 28, 2010).
Notice of Allowance and Fee(s) Due for U.S. Appl. No. 12/240,938 (dated Nov. 4, 2010).
Notice of Allowance and Fee(s) Due for U.S. Appl. No. 10/380,137 (dated Jul. 29, 2005).
Notice of Allowance and Fee(s) Due for U.S. Appl. No. 10/380,137 (dated Mar. 14, 2005).
Nowick et al., "Speculative Completion for the Design of High-Performance Asynchronous Dynamic Adders," In 1997 IEEE International Symposium on Advanced Research in Asynchronous Circuits and Systems, pp. 1-14 (Apr. 1997).
Official Action for U.S. Appl. No. 12/240,938 (dated Jun. 14, 2010).
Schuster et al., "Asynchronous Interlocked Pipelined CMOS Circuits Operating at 3.3-4.5 GHz," Proceedings of the International Solid State Circuits Conference, pp. 292-293 (Feb. 2000).
Seitz, "System Timing," Introduction to VLSI Systems, Chapter 7, Med et al., (eds.), Addison-Wesley, pp. 218-262 (1980).
Singh, "The Design of High-Throughput Asynchronous Pipelines," Ph.D. Thesis, Columbia University, New York, NY, pp. 1-242 (Dec. 2002).
Singh et al., "MOUSETRAP: Ultra-High-Speed Transition-Signaling Asynchronous Pipelines." Proc. of IEEE Intl. Conf. on Computer Design (ICCD-01), Austin, TX, pp. 1-21 (Sep. 2001).
Singh et al., "Fine-Grained Piplined Asynchronous Adders for High-Speed DSP Applications," in IEEE Computer Soicety Annual Workshop on VLSI, IEEE Computer Society Press, pp. 1-8 (Apr. 27-28, 2000).
Singh et al., "High-Throughput Asynchronous Pipelines for Fine-Grain Dynamic Datapaths," In Proceedings of the International Symposium on Advanced Research in Asynchronous Circuits and Systems ("Async2000"), pp. 1-12 (Apr. 2-6, 2000).
Singh et al., "Matching Structural Shape Descriptions Using Genetic Algorithms," Pattern Recognition, vol. 30, No. 9, pp. 1451-1462 (1997).
Singh et al., "MOUSETRAP: Ultra High-Speed Transition-Signaling Asynchronous Pipelines," ACM "Tau-00" workshop, ACM Workshop on Timing Issues in the Specification and Synthesis of Digital Systems, pp. 19-23 (Dec. 4-5, 2000).
Singh, "Clockless Logic," pp. 1-32 (Apr. 6, 2004).
Sokolov et al., "Asynchronous Data Path Models," The Computer Society, pp. 1-12 (2007).
Sparso, Jens et al., Principles of Asynchronous Circuit Design—A Systems Perspective, pp. 1-337 (2001).
Sutherland et al., "GasP: A Minimal FIFO Control," In Proceedings on International Symposium on Advanced Research on Asynchronous Circuits and Systems (ASYNC), pp. 46-53, IEEE Computer Society Press (Mar. 2001).
Sutherland, "Micropipelines," Communications of the ACM, vol. 32, No. 6, pp. 720-738 (Jun. 1989).
Van Berkel et al., "Scanning the Technology: Applications of Asynchronous Circuits," Proceedings of the IEEE, vol. 87, No. 2, pp. 223-233 (Feb. 1999).
van Gageldonk et al., "An Asynchronous Low-Power 80C51 Microcontroller," Proceedings in International Symposium on Advanced Research on Asynchronous Circuits and Systems (ASYNC), pp. 96-107 (1998).
Williams, "Self-Timed Rings and Their Application to Division," Ph.D. Thesis, Stanford University, pp. 1-144 (May 1991).
Wong et al., "Designing High-Performance Digital Cirbuits Using Wave-Pipelining," IEEE Transactions on Computer-Aided Design of Integrated Circuits and Systems, vol. 12, No. 1, pp. 25-46 (Jan. 1993).

(56) References Cited

OTHER PUBLICATIONS

Yee et al., "Clock-Delayed Domino for Adder and Combinational Logic Design," Proceeding ICCD, pp. 332-337 (Oct. 1996).
Yun et al., "High-Performance Asynchronous Pipelines Circuits," Proceedings International Symposium on Advanced Research on Asynchronous Circuits and Systems (ASYNC), pp. 118-123 (1996).

* cited by examiner

CAMERA SENSOR WITH EVENT TOKEN BASED IMAGE CAPTURE AND RECONSTRUCTION

PRIORITY CLAIM

This application claims the priority benefit of U.S. Provisional Patent Application Ser. No. 62/011,403, filed Jun. 12, 2014, which is incorporated by reference herein in its entirety.

TECHNICAL FIELD

The subject matter described herein relates to digital image capture and reconstruction. More particularly, the subject matter described herein relates to a camera sensor with event token based image capture and reconstruction.

BACKGROUND

Still image and video cameras are ubiquitous in today's society. Almost all mobile telephones include an integrated camera, and consumers often select one mobile telephone over another based on the quality of the integrated camera. In addition, portable point and shoot, video, and multi-function cameras are also common. Single lens reflex (SLR) cameras have become commonplace for users that desire to enhance image capture speed and quality.

Features that are desirable in any camera include a high dynamic range such that bright regions in captured images do not appear washed out and dark regions do not lose detail. Another desirable camera feature is the ability to select regions of interest in a captured image and to selectively apply higher dynamic range or other image processing enhancement to the region of interest. In video cameras, higher or variable frame rates may be desirable. It is also desirable to be able to dynamically trade off one feature, such as dynamic range, for another feature, such as frame rate. Another camera feature that may be desirable is frameless image capture, where the exposure time for the individual photodetectors (pixels) does not depend on a predefined start and stop time.

These often competing goals are not achievable by today's cameras. For example, the integrators that accumulate the charge output by pixels on camera phones are typically small capacitors that are easily saturated. Once saturated, the resultant image appears white or washed out. Increasing the integration rate may yield higher quality in darker images but quicker saturation for lighter images. Using a larger integrator that takes longer to saturate may lead to lower quality in dark regions.

Additional areas for improvement for existing cameras include in-pixel processing and column readout. In-pixel processing refers to on-chip processing of the output from the integrator and typically involves an analog to digital converter (ADC). Column readout refers to communication signals for a column of pixels from the photodetector array to post-processing circuitry for image reconstruction. It is possible to convert the signal output from the integrator to digital signal prior to column readout. However, analog to digital conversion prior to readout requires an ADC adjacent to each pixel, which reduces the amount of chip area for the photodiodes. Another option is to send analog values to the post processing circuitry. This solution takes up less area in the photodetector array, but analog signals are susceptible to degradation during transmission (because of noise and crosstalk, for example).

Thus, in light of these difficulties, there exists a need for an improved camera sensor that achieves at least some of the goals described above.

SUMMARY

The subject matter described herein includes a camera sensor with event token based image capture and reconstruction. The sensor includes a photodetector for capturing light from a portion of a scene and for producing a signal indicative of the light. An integrator is coupled to the photodetector for accumulating charge over time from the signal output of the photodetector which can be reset each time the accumulated charge reaches a predetermined level. An in-pixel processor is coupled to the integrator for generating an event token and resetting the integrator in response to the integrator accumulating the predetermined level of charge. A communication pipeline is provided for each column of pixels, through which event tokens are transmitted from the photodetector array to the post-processing circuitry. This circuitry comprises an array of post-processors (PPs), one per pixel, into which the arriving tokens are sorted. Each PP stores the token codes and arrival time of tokens from its corresponding column pixel. These codes and times contain all the necessary information to calculate the total pixel charge accumulated between any two tokens. It is essential that the PPs are physically removed from the pixel array so their necessarily large areas do not compete with the pixel detectors themselves. Indeed, the PPs need not necessarily be on the same chip as the pixel array.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes a camera sensor with event token based image capture and reconstruction. Rather than relying on the capacity of the integrator and the resolution of the A-D converter to determine output image intensity, the subject matter described herein includes in-pixel processing and readout, where the intensity of a pixel in an output image is determined by event tokens and the time of receipt of event tokens by post-processing circuitry and where an event token is generated each K times the integrator becomes full, where K is a prescaling factor. Using such a system, the output image granularity depends on the measurement granularity of the system clock, rather than the capacity or sensitivity of the integrator or an A-D converter to different voltage levels.

Figure 1:
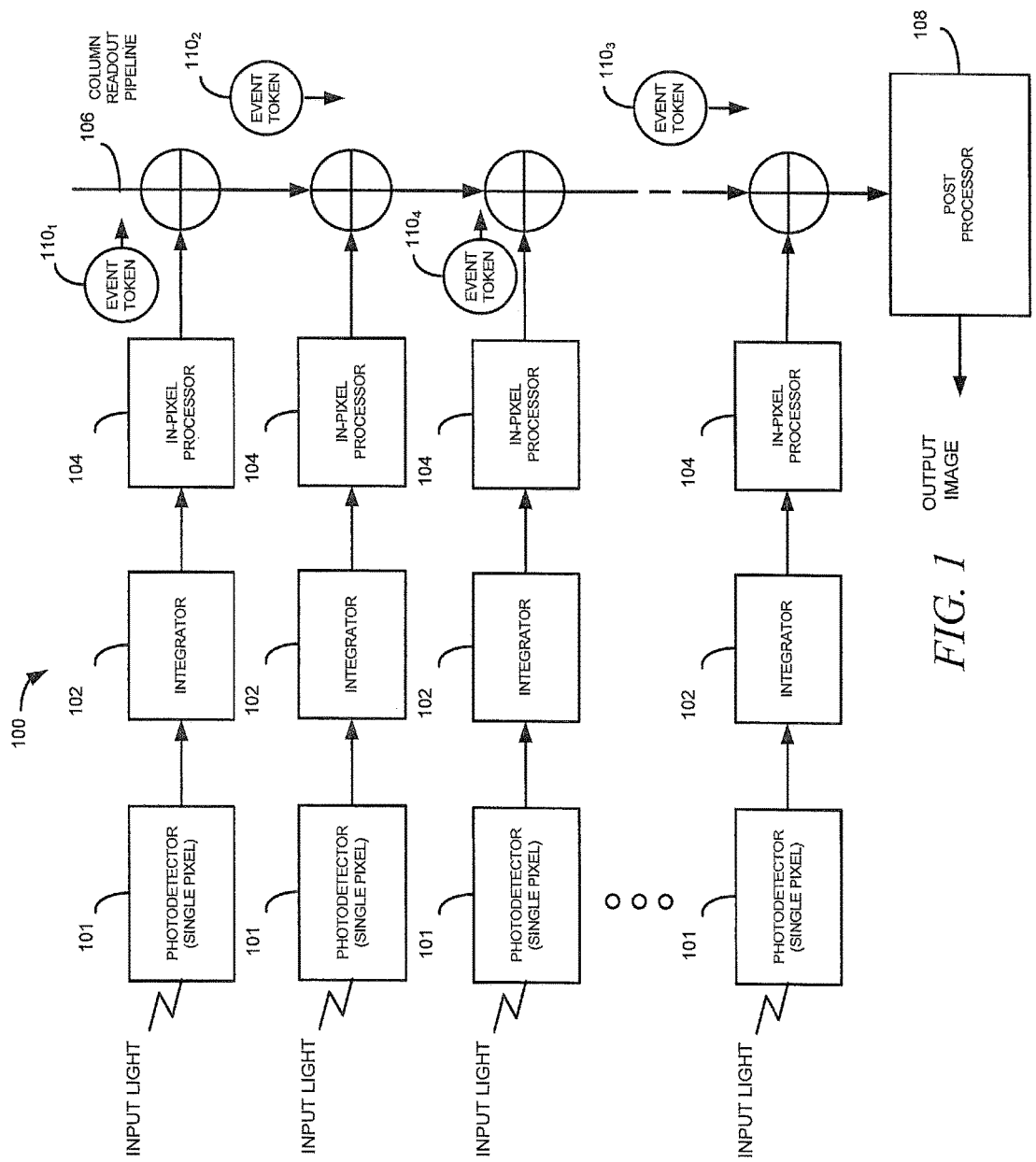
FIG. 1 is a block diagram illustrating an exemplary camera sensor with event token based image capture and reconstruction according to an embodiment of the subject matter described herein.

FIG. 1 is a block diagram illustrating an exemplary camera sensor with event token based image capture and reconstruction according to an embodiment of the subject matter described herein. For clarity, the description of FIG. 1 assumes a prescaling factor K=1. The general case of K>1 is discussed later. Referring to FIG. 1, an exemplary camera sensor 100 includes a plurality of photodetectors 101 for detecting input light. Each photodetector 101 may be a photodiode that detects light for a single pixel used to reconstruct an image. In the example illustrated in FIG. 1, photodetectors and associated circuitry for a single column of pixels is shown. It is understood that the circuitry illustrated in FIG. 1 would be replicated for plural columns to form a 2-dimensional array of photodiodes, integrators, and in-pixel processors. It is understood that a single in-pixel processor may implement the in-pixel processing for all of the pixels. Alternatively, each pixel may include a separate in-pixel processor.

The camera sensor further includes an integrator 102 coupled to each photodetector 101. Each integrator 102 may be a capacitor or other element that accumulates charge in response to the signal output from the photodetector. An in-pixel processor 104 is coupled to each integrator for generating an event token 110 in response to the charge accumulated by the integrator 102 reaching a predetermined level. For example, when an integrator 102 is full or within a predetermined amount of its maximum charge, its associated in-pixel processor 104 may produce an event token 110. Each event token 110 may include an identifier or location of the photodetector, pixel, or integrator for which the event token is produced. Each integrator 102 is reset, either automatically each time the predetermined level of charge is reached, or in response to an external signal.

A column readout communication pipeline 106 receives the event tokens for a given column and delivers the event tokens to a post processor 108. Post processor 108, rather than using analog intensity values that could be output by integrators 102, uses the number of event tokens for each pixel and times of receipt of the event tokens to generate output image pixel intensities. Post processor 108 may record the time of receipt of each event token to allow accurate image intensity calculation without depending on a predefined frame start or end time. In an alternate embodiment, each event token may carry a timestamp generated by in-pixel processors 104 at the time of event token generation.

According to an aspect of the subject matter described herein, in-pixel processors 104 output event tokens 110 asynchronously. Thus, rather than waiting for a rising or falling clock pulse edge, each event token is output when the event occurs. As a result, the system illustrated in FIG. 1 may be more accurate than synchronous camera sensors where events can only be output on rising or falling clock edges.

In addition, as stated above, the accuracy is greatly improved because time can be measured with finer granularity than an ADC can sense different voltage levels. For example, if a 1 gigahertz clock is used, event times can be measured to 1 nanosecond granularity. Thus, for a 1 millisecond inter-event exposure, the accuracy is 1 in $10^6$ or 20 bits. Stated differently, if the lowest non-zero value of image intensity is 1, the next highest image intensity value is 1.000001. This can be contrasted with the granularity of analog to digital converters, which may only sense 12 or fewer bits of intensity levels. The ability to achieve such accuracy results in a much finer gradations in reproducing images of dark regions. This is an important feature since the human eyes' ability to distinguish between intensities is proportional to $\Delta I/I$, where I is the image intensity.

An additional advantage of the system illustrated in FIG. 1 is that there is low area cost at the pixel sensor because the ADC function is accomplished by the integrator's simple reset comparator. In addition, the transmission of event token 110 is digital, so interference from analog noise is avoided.

It is crucial, however, that the column readout communication pipeline 106 have low transport jitter because if the events are time stamped by the post processor 108, the time stamping delay caused by the pipeline should be consistent for different event tokens. It is not crucial, however, for the end-to-end propagation delay of the column pipeline 106 be low because propagation delays of two events used for intensity computation cancel each other out. The dominant cause of transport jitter is traffic congestion in the column pipeline 106. In order to achieve low transport jitter in the column pipeline 106, it is advantageous to use the following techniques: (i) Using the technique of frequency decimation, which reduces the rate at which events are inserted into the column pipeline 106, and/or (ii) Using asynchronous circuits for implementing the column pipeline 106.

Figure 2:
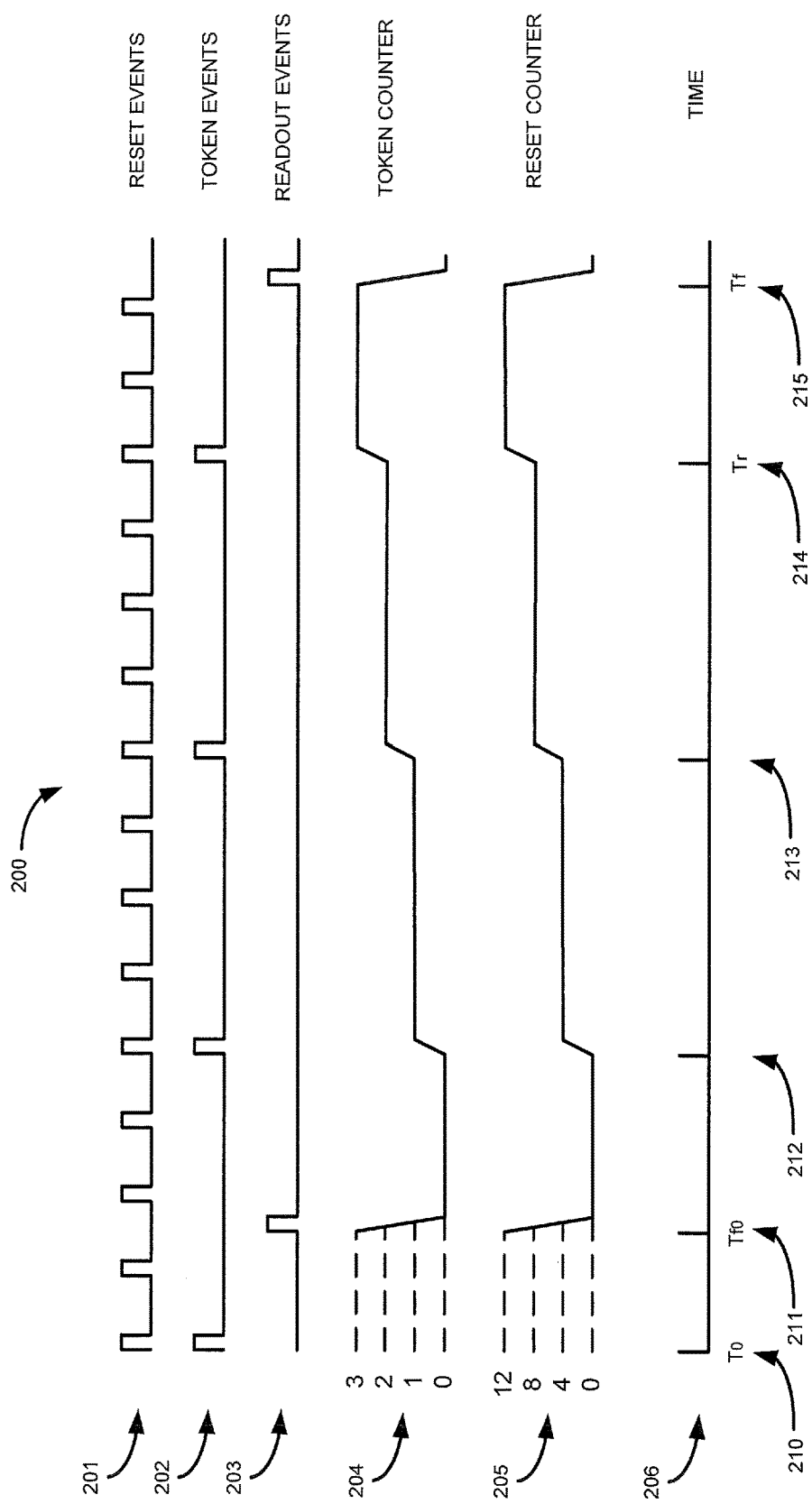
FIG. 2 illustrates the timing relationship of events and postprocessing calculations according to an embodiment of the subject matter described herein.

FIG. 2 illustrates exemplary function of the post processor for calculating pixel intensity values. Graphs 200 represent the processes for one particular pixel of the column. The graphs are aligned with each other in time. The post processor is driven in response to two asynchronous processes, one being the occurrence of token evens 202, the other being the occurrence of readout events 203.

For expositional clarity, FIG. 2 presumes a fixed prescaling factor K=4 and a constant luminous pixel exposure. Accordingly, the in-pixel processor generates a constant rate of reset events 201 and decimates by K to generate event tokens 202 which are transmitted through the column output pipeline. The tokens contain a pixel index and a decimation count K. Assuming a constant delay through the pipeline, the token is routed to a post process corresponding to the pixel index, arriving at a regular rate 202 which drives the said first process at times 210, 212, 213, and 214.

The last token arrival time prior to a readout event is stored by the post processor in register T_0 as subsequently explained. The arrival of each token triggers the first process, which reads a time stamp from a global high speed system counter and stores it in register T_r. Meanwhile, it increments token counter N_t as shown in 204 and adds K to reset counter N_e as shown in 205, which represents the number of times the in-pixel integrator has been reset since T_0, which is in turn a precise representation of the total charge integrated at the instant of occurrence of token 202.

Accordingly, after the occurrence of at least one new token at time 212, a precise value of pixel exposure I=C*N_e/(T_r−T_0) may be calculated, where C is a constant coefficient relating radiometric pixel exposure to I. The same formula is valid after receipt of tokens at times 213 and 214. As an example, FIG. 2 illustrates the case where three new event tokens have been received by time 214. With the arrival of each new token, the relative accuracy is improved as the reciprocal of N_e, because the error in (T_r—T_0) never exceeds the least significant bit of the timestamp.

Concurrently, the post processor receives asynchronous readout requests which arrive as events 203. Each readout event triggers the second process. For very dark pixels, N_t may be zero, in which case more elaborate algorithms may be invoked, some of which are discussed below. In the usual case however, N_t>0 indicates at least one token has occurred since the last readout, so I may be validly calculated and returned in response. Meanwhile, the time stored in T_r is transferred to T_0, and both the token counter and the event counter are reset to zero.

Prior to resetting the token counter, count 205 may be read and a new decimation factor calculated for transmittal to the in-pixel processor through the column readout pipeline. The purpose of this is to minimize the pipeline traffic, as the accuracy of the calculated I is insensitive to count N_t to within a factor of two.

The accuracy of the subject matter described herein may be compared with the conventional approach of counting the number of events occurring in a frame time. In the conventional method, the formula would be C*N_e/(T_f-T_f0), where T_f0 represents time 211 of the beginning of a frame and T_f represents time 215 of the end of the frame. Since T_f0 and T_f are asynchronous with T_0 and T_r, substantial errors can occur from the tightly precise interval (T_r-T_0). The same holds true for T_f even if the two processes are resynchronized at each readout event, for example by using 203 as a global reset signal.

According to the subject matter described herein, a further advantage is to increase the dynamic range over conventional cameras. The upper bound of the dynamic range is determined by the maximum rate of event tokens a bright pixel can generate, which is limited not by the capacity of the integrator but by the throughput of communication pipeline 106. The upper bound is also limited by the maximum rate at which the in-pixel processor 104 can generate reset events. The lower bound of the dynamic range for dark pixels is determined by the minimum number of events generated in a desired readout interval. If the last event token prior to the last readout event is not available, at least two events are needed to measure the time in between events. If the last event token prior to the last readout event is available, then only one new event token is needed before the new readout event in order to measure the time between events.

According to an aspect of the subject matter described herein, in-pixel processor 104 may associate a scaling factor with each event token. The scaling factor is used to pre-scale or divide the frequency of each pixel's event train. The scaling factor is also referred to as a decimation factor. The scaling factor can be used to limit the number of event tokens that are put on pipeline 106 by a single in-pixel processor 104 but still to allow accurate image reconstruction by post processor 108. For example, if communication pipeline 106 becomes congested, post processor 108 may request that in-pixel processor 104 reduce the number of event tokens placed on pipeline 106 by a factor of four. Using such a scaling factor, each in-pixel processor 104 may only output an event token for every four reset events generated by its respective integrator 102. Each event token 110 may either carry its associated scaling factor or post processor 108 may simply maintain the currently requested scaling factor. As a result, when an event token is received and the scaling factor is four, post processor 108 may use the scaling factor to generate a corresponding intensity that counts the single event token as four reset events. It should also be noted that the scaling factor may be set on a per pixel basis such that brighter pixels receive more decimation. In one embodiment, the scaling factor may be set to a power of 2 to facilitate the logical calculations required to implement the scaling factor. However, any integer scaling factor can be used without departing from the subject matter described herein. The scaling factor can be set such that only two event tokens are generated for each pixel within a desired exposure time, which can be arbitrary and set on a per pixel basis.

In order to reconstruct or generate an image when scaling factors are used, post processor 108 may utilize the number of event tokens generated for a particular pixel, the scaling or decimation factor for each event token, and the time separation between the first and last events. Thus, if the number of event tokens is N, the time separation between the first and last events is $\Delta T$, and if all of the most recent N−1 events have an identical decimation factor K, then the output intensity is calculated as $C*K(N-1)/\Delta T$, where C is a proportionality coefficient. Further, if decimation factors are chosen to be powers of 2 (i.e., $K=2^j$), and if a decimation strategy is used to ensure that N is 2, then the output intensity is rewritten as $C*2^j/\Delta T$. Such an intensity representation lends itself to floating point representation ($1/\Delta T$ is the mantissa, j is the exponent), which facilitates computation. Alternatively, the reciprocal of the computed intensity is $1/C*\Delta T*2^{-j}$, which has a trivial floating-point representation that requires only a trivial negation: ($\Delta T$, −j). As a generalization, if the number of event tokens is N, each event token could use a different decimation factor, $K_1$, $K_2$, ... $K_N$, provided the decimation factor for a pixel is updated only at the time instants when an event token is inserted into the column pipeline 106. In this scenario, the output intensity is computed as $C*(K_2+K_3+ ... +K_N)/\Delta T$. This is because there are $K_2$ reset events between event token 1 and event token 2, there are K3 reset events between event token 2 and event token 3, and so on.

The decimation factor for a given pixel can be selected by in-pixel processor 104 or by post processor 108. For example, post processor 108 may select a decimation factor for each pixel and communicate the scaling factors to each in-pixel processor 104 using communication pipeline 106. In one embodiment, the scaling factors may be fed from the top of pipeline 106 where each in-pixel processor accepts the scaling factor if there is an address match. In another embodiment, the scaling factors may be fed into pipeline 106 from the bottom in a counter flow fashion.

In an embodiment in which each in-pixel processor 104 independently selects its own scaling factor, the in-pixel processor may utilize reset event frequency and/or event token frequency in making the selection. For example, each in-pixel processor 104 may set its scaling factor to a number greater than 1 if it determines that the number of event tokens that it is generating exceeds a certain frequency.

In one embodiment, a reference timing signal is sent to all the pixels. This reference timing signal is a series of pulses with a certain period/frequency. The in-pixel processor counts the number of reset tokens and/or event tokens during this reference timing period, and accordingly sets/adjusts its scaling factor so that the number of even tokens produced during each subsequent reference timing period is no greater than a number M. The number M could be predetermined, or it could be determined by the post processor; in the latter case, it could be different for different pixels. For example, M could be 2, which means all pixels will calibrate their scaling factors so as to generate no more than two event tokens.

In another embodiment, the in-pixel processor updates the scaling factor according to a predetermined sequence. For example, the scaling factor could be 1 for the first event token, 2 for the second event token, 4 for the third event token, doubling with each subsequent token. There may be an upper bound so that the scaling factor is not increased beyond the upper bound. This means that, for the given example, the event tokens will be spaced further apart as time goes on. As a result, the event token frequency of the bright pixels will quickly decrease, thereby reducing the demand on the communication network. The post process can tell the in-pixel processor to restart the scaling according to the predetermined sequence either using a special restart signal sent to all the pixels, or a special token addressed to a particular pixel through the column pipeline.

According to another aspect of the subject matter described herein, frameless image capture can be achieved. There is no need to synchronize the start and stop time for defining the exposure of different pixels. In addition, the readout process for one pixel need not be synchronized with the readout process for other pixels. Each in-pixel processor 104 generates its associated event token train independently and asynchronously. Post processor 108 may keep track of the two most recent event tokens for a given pixel. Each pixel may be decimated to generate a minimum of two events during a predetermined desired readout interval. It should also be noted that the readout interval can be set on a per pixel basis so that different pixels may have different exposure times. The ability to independently define readout intervals for different pixels can be thought of as frameless image capture, and there is no defined time at which all pixels must be simultaneously read. As a result of this frameless image capture, dark pixels can be reproduced. For example, if a given pixel produces only one event token during a desired readout interval, the previously stored final event token for the readout interval can be used to generate the dark pixel's intensity value. In another example, if zero events are produced during a readout interval, the previously stored two events from one or more previous readout intervals can be utilized. Each dark region can be reproduced without lengthening the exposure time for brighter pixel. Because image generation doesn't depend on a synchronized frame start and stop time, camera sensor 100 becomes a continuously sensing camera, i.e., the shutter can remain open without saturating the pixels. In addition, the rate at which the image is read out from the processing logic may be decoupled from the per pixel rates with which the image is sensed. Moreover, different pixels of the image may be read out from the processing logic at different rates.

According to another aspect of the subject matter described herein, regions of interest can be selected and enhanced independently of other regions in the image. Multiple regions of interest can be composed of pixels located at arbitrary locations in the image, not necessarily rectangular, or even contiguous. Moreover, regions of interest can be modified dynamically, for example to follow a rapidly changing feature while retaining a high quality low frame rate output of the relatively static background. A benefit is that overall energy and/or power consumed by the sensor may be lowered by expending less energy and/or power outside of the regions of interest.

Some initial simulation results of the subject matter described herein indicate pixel values that are 20 bit numbers, which result in an accuracy of 1 in $2^{20}$ (1 in $10^6$). The dynamic range is $1:2^{20}$, and the signal to noise ratio is about 120 dB (decibels). Current commodity cameras typically provide 8 to 12 bit values of pixel intensity, with only some high-end ones providing 14 bit values. Their accuracy is limited by the size of their least significant bit, which is poor at low intensities, 1, 2, 3, etc. Thus, visual "contouring" is an unavoidable artifact of enhancing dark regions by simple scaling. This artifact is negligible for the subject matter described herein.

Figure 3:
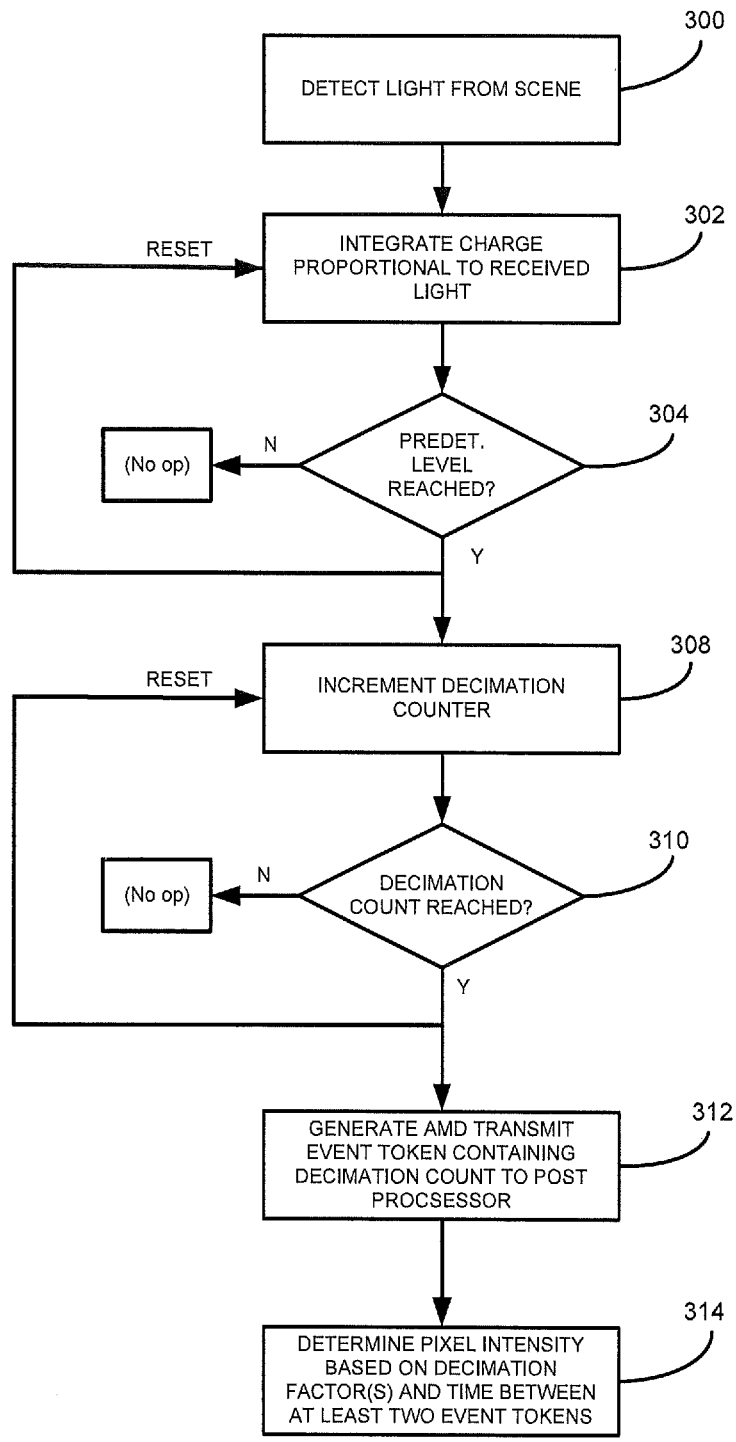
FIG. 3 is a flow chart illustrating an exemplary process for event token based image capture and reconstruction according to an embodiment of the subject matter described herein.

FIG. 3 is a flow chart illustrating an exemplary process for event token based image capture and reconstruction. The steps illustrated in FIG. 3 are for a single photodetector, integrator, and in-pixel processing for a single pixel. However, it is understood that the steps illustrated in FIG. 3 would be performed by each photodetector, integrator, and in-pixel process to form a complete output image. Referring to FIG. 3, in step 300, light is detected from the scene. The light may be detected by a photodetector 101. In step 302, charge produced by the photodetector is integrated in proportion to the received light. For example, one of integrators 102 may integrate the signal output from its respective photodetector. Steps 300 and 302 occur continuously as light is collected from the scene. In step 304, it is determined whether a predetermined level of charge is reached. The predetermined level of charge may be an engineered value that is based on the capacity of the integrator. If the predetermined level of charge is reached, the integrator is reset and control proceeds to step 306 where the decimation counter is incremented.

In step 308, it is determined whether a predetermined decimation count has been reached. The predetermined decimation count may be the decimation count set by the in-pixel processor or the post processor based on a desired event frequency for the pixel. If the predetermined decimation count has been reached, the decimation counter is reset and control proceeds to step 310 where an event token is generated and communicated to the post processor. The event token contains the decimation count, which in this example is the same as the reset event count. In step 312, the post processor receives and stores the event token, including the decimation count and the event token or pixel identifier. In step 314, the post processor determines a pixel intensity based on the decimation factors and the total time between at least two event tokens. For example, if there are two consecutive event tokens, $E_1$ and $E_2$, if the decimation factor for token $E_1$ is 3, the decimation factor for token $E_2$ is 6, and the time between $E_1$ and $E_2$ is 4, then the output pixel intensity will be proportional to $(6)/4=1.5$. This is because the number of reset events between consecutive event tokens $E_1$ and $E_2$ is given by the decimation factor of $E_2$. The post processor may use the pixel identifiers for event tokens generated by different in-pixel processors to reconstruct the entire image from the intensities calculated for each pixel.

The process of data acquisition from a spatially compact, area-critical array of analog continuous time sensors imposes performance limits in addition to those inherent to the sensors themselves. We propose methods and apparati described herein for improving this process to more fully exploit the potential of such sensors. We emphasize this is not about improving the sensors themselves, but improving the means for extracting their data.

Very generally, the methods described herein can be applied to any collection of spatially distinct continuous-time continuous-level signal sources, the desired outputs of which are to be discretely digitized representations of their respective time integrals between distinct instants. Accordingly, any examples we give of preferred embodiments should not be interpreted as limiting the applicability of these methods to the technologies peculiar to these embodiments. That said, the subject matter described herein focuses on CMOS photo and video imaging technology and details of the methods and the apparati used to implement them. However, the subject matter described herein is not limited to processing signals output from video or other optical image sensors. In an alternate embodiment, the subject matter described herein may be used to process signals output from acoustic sensors, thermal sensors, or any other type of sensor that produces a continuous analog signal.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A camera sensor with event token image capture and reconstruction comprising:
    a photodetector for detecting light from a portion of a scene and producing a signal indicative of the light;
    an integrator for accumulating charge resulting from the signal output by the photodetector;
    an in-pixel processor for, in response to each accumulation by the integrator of a predetermined level of charge, resetting the integrator, wherein the in-pixel processor generates event tokens such that each event token coincides in time with an integrator reset event;
    a communication pipeline for communicating the event tokens from the in-pixel processor for downstream processing; and
    a post processor for receiving the event tokens and determining an output intensity based on a number of reset events and a time between at least two of the event tokens, wherein determining the output intensity includes dividing a value of a reset event counter by a difference in arrival times of two of the event tokens at the post processor and wherein the communication pipeline has a substantially constant propagation delay for communicating the event tokens from the in-pixel processor to the post processor.

2. The camera sensor of claim 1 wherein the photodetector is configured to capture light for a single pixel and wherein the event token carries a pixel identifier.

3. The camera sensor of claim 2 wherein the post processor is configured to determine an output intensity for the pixel based on the number of reset events and the time between the at least two event tokens.

4. The camera sensor of claim 1 wherein each event token is associated with a scaling factor.

5. The camera sensor of claim 4 wherein the scaling factor comprises a decimation factor that allows a reduction in the number of event tokens output by the in-pixel processor to the communication pipeline to a predetermined number and wherein the post processor uses the decimation factor to determine the output intensity.

6. The camera sensor of claim 4 wherein the in-pixel processor generates the scaling factor.

7. The camera sensor of claim 4 wherein the post processor generates the scaling factor and communicates the scaling factor to the in-pixel processor via the communication pipeline.

8. The camera sensor of claim 4 wherein the scaling factor is selected on a per pixel or per region of interest basis.

9. The camera sensor of claim 4 wherein the scaling factor is selected based on a desired event frequency.

10. The camera sensor of claim 1 wherein the in-pixel processor generates and outputs the event tokens asynchronously.

11. The camera sensor of claim 1 wherein the in-pixel processor is configured to produce the event tokens independently of event tokens generated by in-pixel processing for other pixels, thereby achieving frameless image capture.

12. The camera sensor of claim 1 wherein the in-pixel processor is configured to store previous events generated for each pixel.

13. The camera sensor of claim 1 wherein the photodetector is continuously exposed to the scene to achieve continuous image capture.

14. A method for event token image capture and reconstruction, the method comprising:
    detecting, using a photodetector, light from a portion of a scene and producing a signal indicative of the light;
    accumulating, using an integrator, charge resulting from the signal output by the photodetector;
    in response to each accumulation by the integrator of a predetermined level of charge, resetting the integrator;
    generating, using an in-pixel processor, event tokens such that each event token coincides in time with an integrator reset event;
    communicating the event tokens from the in-pixel processor for downstream processing; and
    receiving, using a post processor, the event tokens and determining an output intensity based on a number of reset events and a time between at least two of the event tokens, wherein determining the output intensity includes dividing a value of a reset event counter by a difference in arrival times of two of the event tokens at the post processor and wherein communicating the event tokens from the in-pixel processor for downstream processing includes communicating the event tokens from the in-pixel processor to the post processor over a communication pipeline having a substantially constant propagation delay for the event tokens communicated from the in-pixel processor to the post processor.

15. The method of claim 14 wherein the photodetector is configured to capture light for a single pixel and wherein the event token carries a pixel identifier.

16. The method of claim 15 wherein the post processor is configured to determine an output intensity for the pixel based on the number of reset events and the time between the at least two event tokens.

17. The method of claim 14 wherein each event token is associated with a scaling factor.

18. The method of claim 17 wherein the scaling factor comprises a decimation factor that allows a reduction in the number of event tokens output by the in-pixel processor to a communication pipeline to a predetermined number and wherein the post processor uses the decimation factor to generate the output image.

19. The method of claim 17 wherein the in-pixel processor generates the scaling factor.

20. The method of claim 17 wherein the post processor generates the scaling factor and communicates the scaling factor to the in-pixel processor via a communication pipeline.

21. The method of claim 17 wherein the scaling factor is selected on a per pixel or per region of interest basis.

22. The method of claim 17 wherein the scaling factor is selected based on a desired event frequency.

23. The method of claim 14 wherein the in-pixel processor generates and outputs the event tokens asynchronously.

24. The method of claim 14 wherein the in-pixel processor is configured to produce the event tokens independently of event tokens generated by in-pixel processing for other pixels, thereby achieving frameless image capture.

25. The method of claim 14 wherein the in-pixel processor is configured to store previous events generated for each pixel.

26. The method of claim 14 wherein the photodetector is continuously exposed to the scene to achieve continuous image capture.

27. A non-transitory computer readable medium comprising computer executable instructions embodied in the non-transitory computer readable medium that when executed by a processor of a computer perform steps comprising:
   detecting, using a photodetector, light from a portion of a scene and producing a signal indicative of the light;
   accumulating, using an integrator, charge resulting from the signal output by the photodetector;
   in response to each accumulation by the integrator of a predetermined level of charge, resetting the integrator;
   generating, using an in-pixel processor, event tokens such that each event token coincides in time with an integrator reset event;
   communicating the event tokens from the in-pixel processor for downstream processing; and
   receiving, using a post processor, the event tokens and determining an output intensity based on a number of reset events and a time between at least two of the event tokens, wherein determining the output intensity includes dividing a value of a reset event counter by a difference in arrival times of two of the event tokens at the post processor and wherein communicating the event tokens from the in-pixel processor for downstream processing includes communicating the event tokens from the in-pixel processor to the post processor over a communication pipeline having a substantially constant propagation delay for the event tokens communicated from the in-pixel processor to the post processor.

* * * * *